US011562456B2

(12) United States Patent
Yan

(10) Patent No.: US 11,562,456 B2
(45) Date of Patent: Jan. 24, 2023

(54) INTELLIGENT PORT CONTROL SYSTEM AND RELATED SYSTEMS AND APPARATUSES

(71) Applicant: BEIJING TUSEN ZHITU TECHNOLOGY CO., LTD., Beijing (CN)

(72) Inventor: Chao Yan, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 396 days.

(21) Appl. No.: 16/677,415

(22) Filed: Nov. 7, 2019

(65) Prior Publication Data

US 2020/0143501 A1    May 7, 2020

(30) Foreign Application Priority Data

Nov. 7, 2018    (CN) .......................... 201811321227.0

(51) Int. Cl.
*G06Q 50/28* (2012.01)
*G06Q 10/10* (2012.01)
(Continued)

(52) U.S. Cl.
CPC ............. *G06Q 50/28* (2013.01); *B63H 25/02* (2013.01); *B66C 13/48* (2013.01); *G05D 1/0088* (2013.01);
(Continued)

(58) Field of Classification Search
CPC .... B65G 67/60; B65G 67/603; B65G 67/606; B65G 67/62; B66C 13/23; B66C 13/48;
(Continued)

(56) References Cited

U.S. PATENT DOCUMENTS

| | | | | |
|---|---|---|---|---|
| 6,081,292 A | * | 6/2000 | Lanigan, Jr. .......... | B66C 19/007 414/139.6 |
| 2008/0252417 A1 | * | 10/2008 | Thomas ................. | G06Q 10/08 340/10.1 |

FOREIGN PATENT DOCUMENTS

| | | | | | |
|---|---|---|---|---|---|
| KR | 20100078837 A | * | 10/2010 | ............. | B66C 13/40 |
| KR | 20140104074 A | * | 8/2014 | ........... | B65G 63/004 |

* cited by examiner

*Primary Examiner* — Russell Frejd
*Assistant Examiner* — Sara J Lewandroski
(74) *Attorney, Agent, or Firm* — Paul Liu; Julie J. Muyco; Perkins Coie, LLP

(57) ABSTRACT

The present disclosure provides an intelligent port control system and related systems and apparatuses, capable of achieving fully automated ship loading and unloading. The intelligent port control system includes: a scheduling center system configured to determine a ship loading plan based on ship information, container information, and shore crane apparatus information, and generate a ship berthing task, a ship loading task, and a container distribution task based on the ship loading plan, for transmitting to a ship control system of a target ship, a shore crane control system of a target shore crane apparatus, and a warehouse management system of a warehouse center, respectively; the ship control system configured to control the target ship to move to an operation area corresponding to the target shore crane apparatus; the shore crane control system configured to control the target shore crane apparatus to load a container on a transportation vehicle onto the target ship; the warehouse management system configured to assign a warehouse hoisting apparatus to hoist a target container in the container distribution task onto the transportation vehicle; and a vehicle control system configured to control the transportation vehicle to move to a container loading location for loading the container, and to control the transportation
(Continued)

vehicle to move to a container unloading location for unloading the container.

14 Claims, 4 Drawing Sheets

(51) Int. Cl.
*B66C 13/48* (2006.01)
*B63H 25/02* (2006.01)
*G05D 1/00* (2006.01)

(52) U.S. Cl.
CPC ... *G06Q 10/1097* (2013.01); *B63H 2025/028* (2013.01)

(58) Field of Classification Search
CPC ........ B66C 2700/087; B66C 2700/088; B66C 23/60; B66C 23/605; B66D 1/48; B66D 1/485; B66D 1/66; B66D 1/663; G05D 1/0022
See application file for complete search history.

INTELLIGENT PORT CONTROL SYSTEM AND RELATED SYSTEMS AND APPARATUSES

CROSS-REFERENCE TO RELATED APPLICATION(S)

This patent document claims the benefit of priority of Chinese Patent Application No. 201811321227.0, filed Nov. 7, 2018. The entire content of the before-mentioned patent application is incorporated by reference as part of the disclosure of this application.

TECHNICAL FIELD

The present disclosure relates to intelligent control technology, and more particularly, to an intelligent port control system and related systems and apparatuses.

BACKGROUND

As a hub station for waterway-land coordinated transportation, a port is a buffer for conversion of transportation schemes of containerized goods, and plays an important role in the whole container transportation process. At the port, container transportation operations such as container unloading and container loading are required for inbound and outbound containers.

The process of container unloading is generally as follows. After a ship arrives at a port, a container is first moved onto a transportation vehicle by a shore crane (or shore bridge). Then, the container is transported by the transport vehicle to a yard (or warehouse center). Finally, the container on the transportation vehicle is placed at a corresponding location in the yard by a warehouse hoisting apparatus (such as a rail-mounted gantry crane, a rubber-tired gantry crane, a forklift, etc.) near the yard, thereby completing the ship unloading operation.

The process of container loading is generally as follows. A container in a yard is lifted and placed onto a transportation vehicle by a warehouse hoisting apparatus at the yard, and transported by the transportation vehicle to a shore crane where a ship is located. The container on the transportation vehicle is placed onto the ship by the shore crane, thereby completing the ship loading operation.

SUMMARY

In an aspect, an intelligent port control system is provided according to an embodiment of the present disclosure. The intelligent port control system includes: a scheduling center system configured to determine a ship loading plan based on ship information, container information, and shore crane apparatus information, generate a ship berthing task, a ship loading task, and a container distribution task based on the ship loading plan, and transmit the ship berthing task, the ship loading task, and the container distribution task to a ship control system of a target ship, a shore crane control system of a target shore crane apparatus, and a warehouse management system of a warehouse center, respectively; the ship control system configured to control, upon receiving the ship berthing task, the target ship to move to an operation area corresponding to the target shore crane apparatus, and transmit a ship in-position notification message to the shore crane control system of the target shore crane apparatus; the shore crane control system configured to control, upon receiving the ship in-position notification message from the ship control system, the target shore crane apparatus to load a container on a transportation vehicle onto the target ship in accordance with the received ship loading task; the warehouse management system configured to assign, upon receiving the container distribution task, a warehouse hoisting apparatus to hoist a target container in the container distribution task onto the transportation vehicle; and a vehicle control system configured to control, upon receiving a container transportation task, the transportation vehicle to move to a container loading location associated with the container transportation task for loading the container, and to control, when completing the loading of the container, the transportation vehicle to move to a container unloading location associated with the container transportation task for unloading the container.

In another aspect, a scheduling center system is provided according to an embodiment of the present disclosure. The scheduling center system includes at least one machine executable instruction. The at least one machine executable instruction includes a scheduling communication module, a plan generation module and a task generation module. The at least one machine executable instruction is executed by a processor such that: the scheduling communication module is configured to transmit and receive information, the plan generation module is configured to determine a ship loading plan based on ship information, container information, and shore crane apparatus information, and the task generation module is configured to generate a ship berthing task, a ship loading task, and a container distribution task based on the ship loading plan, and transmit the ship berthing task, the ship loading task, and the container distribution task to a ship control system of a target ship, a shore crane control system of a target shore crane apparatus, and a warehouse management system of a warehouse center, respectively, via the scheduling communication module.

In another aspect, a scheduling center system is provided according to an embodiment of the present disclosure. The scheduling center system includes at least one processor and at least one memory. The at least one memory stores any of the above scheduling center system executable by the at least one processor.

In another aspect, a ship control system is provided according to an embodiment of the present disclosure. The ship control system includes at least one machine executable instruction. The at least one machine executable instruction includes a ship communication module and a ship control module. The at least one machine executable instruction is executed by a processor such that: the ship communication module is configured to transmit and receive information, and the ship control module is configured to receive a ship berthing task from a scheduling center system via the ship communication module, control a target ship to move to an operation area corresponding to a target shore crane apparatus in accordance with the received ship berthing task, and transmit a ship in-position notification message to a shore crane control system of the target shore crane apparatus via the ship communication module.

In another aspect, a ship control system is provided according to an embodiment of the present disclosure. The ship control system includes at least one processor and at least one memory. The at least one memory stores the above ship control system executable by the at least one processor.

In another aspect, a ship is provided according to an embodiment of the present disclosure. The ship includes the ship control system according to the above embodiment.

In another aspect, a shore crane control system is provided according to an embodiment of the present disclosure. The shore crane control system includes at least one machine executable instruction. The at least one machine executable instruction includes a shore crane communication module and a hoisting control module. The at least one machine executable instruction is executed by a processor such that: the shore crane communication module is configured to transmit and receive information, and the hoisting control module is configured to receive a ship loading task transmitted from a scheduling center system via the shore crane communication module, and upon receiving a ship in-position notification message transmitted from a ship control system via the shore crane communication module, control a target shore crane apparatus to load a container on a transportation vehicle onto a target ship in accordance with the received ship loading task.

In another aspect, a shore crane control system is provided according to an embodiment of the present disclosure. The shore crane control system includes at least one processor and at least one memory. The at least one memory stores any of the above shore crane control system executable by the at least one processor.

In another aspect, a shore crane apparatus is provided according to an embodiment of the present disclosure. The shore crane apparatus includes the shore crane control system according to the above embodiment.

In another aspect, a vehicle control system is provided according to an embodiment of the present disclosure. The vehicle control system includes at least one machine executable instruction. The at least one machine executable instruction includes a vehicle communication module and a vehicle control module. The at least one machine executable instruction is executed by a processor such that: the vehicle communication module is configured to transmit and receive information, and the vehicle control module is configured to control, upon receiving a container transportation task via the vehicle communication module, a transportation vehicle to move to a container loading location associated with the container transportation task for loading a container, and to control, when completing the loading of the container, the transportation vehicle to move to a container unloading location associated with the container transportation task for unloading the container.

In another aspect, a vehicle control system is provided according to an embodiment of the present disclosure. The vehicle control system includes at least one processor and at least one memory. The at least one memory stores the above vehicle control system executable by the at least one processor.

In another aspect, a transportation vehicle is provided according to an embodiment of the present disclosure. The transportation vehicle includes the above vehicle control system.

In another aspect, a warehouse management system is provided according to an embodiment of the present disclosure. The warehouse management system includes at least one machine executable instruction. The at least one machine executable instruction includes a warehouse communication module and a warehouse management module. The at least one machine executable instruction is executed by a processor such that: the warehouse communication module is configured to transmit and receive information, and the warehouse management module is configured to assign, upon receiving a container distribution task via the warehouse communication module, a warehouse hoisting apparatus to hoist a target container in the container distribution task onto a transportation vehicle.

In another aspect, a warehouse management system is provided according to an embodiment of the present disclosure. The warehouse management system includes at least one processor and at least one memory. The at least one memory stores the above warehouse management system executable by the at least one processor.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in further detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, exemplary embodiments of the present disclosure will be described in further detail with reference to the figures. While the exemplary embodiments of the present disclosure are shown in the figures, it is to be noted that the present disclosure can be implemented in various forms and are not limited to the embodiments described below. Rather, these embodiments are provided to facilitate a more thorough understanding of the present disclosure and to convey the scope of the present disclosure fully to those skilled in the art.

Conventionally at a port, the above container transportation operations such as loading and unloading require human intervention. For example, ships need to be steered and controlled by humans to berth at specified locations. Hoisting apparatus and transportation vehicles need to be driven and operated by operators to perform operations such as container loading, container unloading and transportation. Yards or warehouse centers also need human intervention to arrange locations at which containers are to be placed. Thus, the conventional container transportation operations at the port have low level of intelligence and require a large amount of human resources, resulting in a low operation efficiency. Further, due to the complicated environment in the field, it is difficult to guarantee the safety of the operators. Moreover, the labor cost is relatively high as a large number of operators are required.

With the intelligent port control system according to the embodiments of the present disclosure, for an operation of loading a container onto a ship at a port, a scheduling center system, a ship control system, a shore crane control system, a warehouse management system and a vehicle control system exchange information with each other, so as to achieve fully automated, unmanned loading/unloading operations at the port, thereby improving the intelligence level of the loading/unloading and transportation operations of containers at the port, reducing requirements on human resources and labor cost, improving operation efficiency and avoiding the problem associated with lack of safety guarantee for operators.

Figure 1:
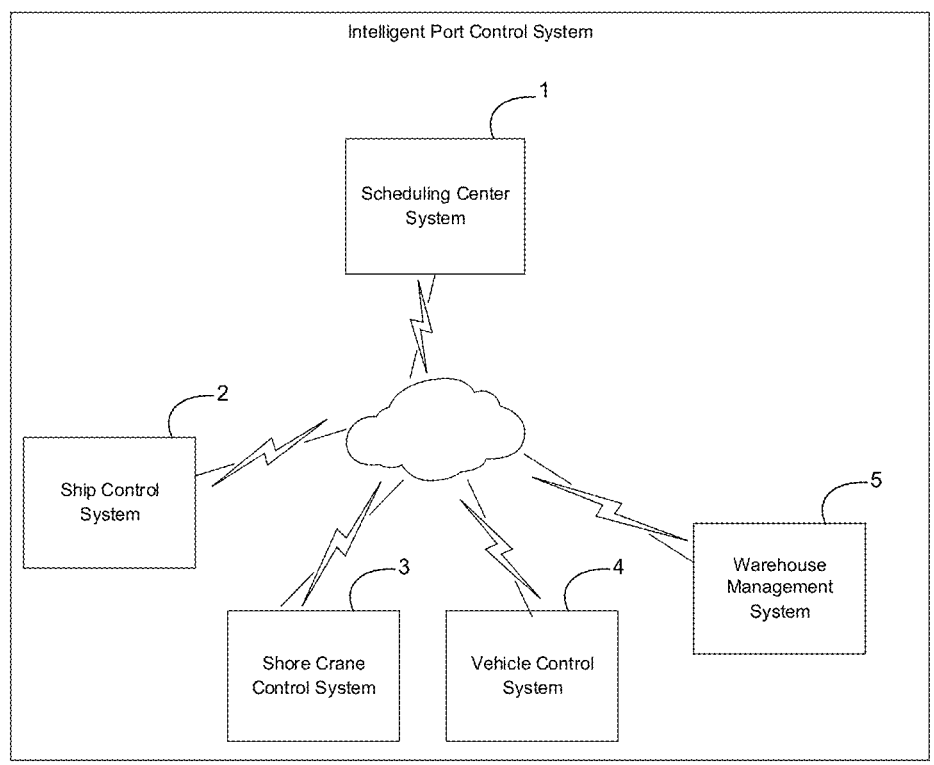
FIG. 1 is a schematic diagram showing a structure of an intelligent port control system according to an embodiment of the present disclosure.

FIG. 1 is a schematic diagram showing an intelligent port control system according to an embodiment of the present disclosure. Referring to FIG. 1, the intelligent port control system includes a scheduling center system 1, a ship control system 2 provided at a ship, a shore crane control system 3 provided at a shore crane apparatus, a warehouse management system 5 provided at a warehouse center, and a vehicle control system 4 provided at a transportation vehicle.

The scheduling center system 1 is configured to determine a ship loading plan based on ship information, container information, and shore crane apparatus information, generate a ship berthing task, a ship loading task, and a container distribution task based on the ship loading plan, and transmit the ship berthing task, the ship loading task, and the container distribution task to a ship control system 2 of a target ship, a shore crane control system 3 of a target shore crane apparatus, and a warehouse management system 5 of a warehouse center, respectively (i.e., the scheduling center system 1 transmits the ship berthing task to the ship control system 2 of the target ship, transmits the ship loading task to the shore crane control system 3 of the target shore crane apparatus, and transmits the container distribution task to the warehouse management system 5 of the warehouse center).

The ship control system 2 is configured to control, upon receiving the ship berthing task, the target ship to move to an operation area corresponding to the target shore crane apparatus, and transmit a ship in-position notification message to the shore crane control system 3 of the target shore crane apparatus.

The shore crane control system 3 is configured to control, upon receiving the ship in-position notification message from the ship control system 2, the target shore crane apparatus to load a container on a transportation vehicle onto the target ship in accordance with the received ship loading task.

The warehouse management system 5 is configured to assign, upon receiving the container distribution task, a warehouse hoisting apparatus to hoist a target container in the container distribution task onto the transportation vehicle.

The vehicle control system 4 is configured to control, upon receiving a container transportation task, the transportation vehicle to move to a container loading location associated with the container transportation task for loading the container, and to control, when completing the loading of the container, the transportation vehicle to move to a container unloading location associated with the container transportation task for unloading the container.

In an embodiment of the present disclosure, a warehouse management system 5 can manage one or more container areas. If the container areas in which the storages locations of the containers in the ship loading plan are located are distributed across a plurality of warehouse management systems, the scheduling center system 1 can generate a plurality of container distribution tasks based on the ship loading plan and transmit them to the respective warehouse management systems 5. Assuming that one warehouse management system 5 manages one container area and the container areas corresponding to the storages locations of a number, M, of containers in a ship loading plan are distributed over Container Area A, Container Area B, Container Area C and Container Area D managed by Warehouse Management Systems A~D, respectively, the scheduling center system 1 can generate four container distribution tasks, with the containers in each container distribution task having the same target container area, and transmit the four container distribution tasks to Warehouse Management Systems A~D, respectively.

In some optional embodiments, the ship information may include ship arrival time and ship state information. The shore crane apparatus information may include operation time information of each shore crane apparatus in a port area. The container information may include a number of containers and identification information and destination information of each container. The scheduling center system 1 generating the ship loading plan based on the ship information, the container information, and the shore crane apparatus information may include: determining a storage location of each container based on the identification information of the container; determining a target ship based on the number of containers, the destination information of each container, the ship arrival time and ship state information of each ship in the ship information; determining the target shore crane apparatus based on the ship arrival time of the target ship and the operation time information of each shore crane apparatus in the shore crane apparatus information; estimating ship loading start time and ship loading end time based on the ship arrival time of the target ship, the operation time information of the target shore crane apparatus and the number of containers, and generating the ship loading plan containing identification information of the target ship, identification information of the target shore crane apparatus, the ship loading start time, the ship loading end time and the identification information and the storage location for each container.

In an embodiment, the ship loading start time can be determined by: determining whether the target shore crane apparatus is in an idle state at the ship arrival time based on the operation time of the target shore crane apparatus; and if so, determining the ship arrival time or the time at which the ship has arrived and berthed as the ship loading start time, or otherwise determining the time at which the target shore crane apparatus completes the task it is performing at the ship arrival time as the ship loading start time.

In an embodiment, the ship loading end time can be determined by: calculating a time length required for the target shore crane apparatus to load the container onto the target ship based on a historical operation rate of the target shore crane apparatus; and obtaining the ship loading end time based on the ship loading start time and the time length.

As an implementation of the embodiment of the present disclosure, the ship state information may include tonnage information of each ship and a travel route of each ship. The scheduling center system 1 can select ships satisfying a container transportation requirement based on the destination information of the containers and the travel route of each ship, and select, as the target ship, a ship satisfying a container loading requirement from the ships satisfying the container transportation requirement based on the number of containers and the identification information of each container and the tonnage information of the ships.

As an implementation of the embodiment of the present disclosure, the scheduling center system 1 determining the target shore crane apparatus based on the ship arrival time of the target ship and the operation time information of each shore crane apparatus in the shore crane apparatus information may include: determining one or more shore crane apparatuses available at the ship arrival time based on the ship arrival time of the target ship and the operation time information of each shore crane apparatus; and selecting one of the determined one or more shore crane apparatuses as the target shore crane apparatus. The available shore crane apparatus may refer to a shore crane apparatus that is in an idle state at the arrival time, or a shore crane apparatus that is about to complete its operation at the arrival time.

As an implementation of the embodiment of the present disclosure, when determining the target shore crane apparatus based on the ship arrival time and the operation time information of each shore crane apparatus in the shore crane apparatus information, if the operation area of the target ship is enough for two or more shore crane apparatuses to perform hoisting operations, the scheduling center system 1 can select two or more of the shore crane apparatuses in the idle state based on size information and the operation area of the ship, as target shore crane apparatuses. In the ship loading operation, different target shore crane apparatuses can hoist containers within their respective operation ranges in accordance with the ship loading task and load the containers onto the target ship, so as to shorten the operation time and improve the operation efficiency.

As an implementation of the embodiment of the present disclosure, during the ship loading process, if the currently determined target shore crane apparatus cannot meet a container hoisting requirement, e.g., when the currently determined target shore crane apparatus malfunctions during the hoisting operation, the scheduling center system 1 can reselect another available hoisting apparatus as a new target shore crane apparatus based on current time information and the operation time information of each shore crane apparatus in the shore crane apparatus information.

In some optional embodiments, the scheduling center system 1 generating the ship berthing task, the ship loading task, and the container distribution task based on the ship loading plan may include: generating the ship berthing task containing identification information and an operation area of the target shore crane apparatus, based on the ship loading plan; generating the ship loading task containing identification information of the target ship, ship loading start time, ship loading end time and identification information of each container based on the ship loading plan; and generating the container distribution task containing identification information of the identification information of the target shore crane apparatus, ship loading start time, ship loading end time and identification information and storage location of each container based on the ship loading plan.

In some optional embodiments, the scheduling center system 1 can be further configured to generate the container transportation task based on the ship loading plan and transmit the container transportation task to the vehicle control system 4 of the transportation vehicle.

In some optional embodiments, the ship control system 2 can be further configured to: determine a travel time length from a current location of the ship to the port based on the current location, a location of the port and a travel route; estimating arrival time at which the target ship arrives at the port based on the travel time length and current time; and transmitting the ship information containing the estimated arrival time and ship state information to the scheduling center system 1.

In an embodiment, the arrival time at which the target ship arrives at the port can be estimated based on a departure location, the location of the target port and the predetermined travel route when the target ship is to travel from the departure location to the target port. In particular, the ship control system 2 of the target ship can determine the predetermined travel route based on the departure location and the location of the port, estimate a travel speed of the ship based on a current weather condition and maritime information obtained at the time of departure, calculate the required travel time length of the ship and obtain the estimated arrival time based on the current time.

In an embodiment, the arrival time at which the target ship arrives at the port can be obtained as follows. While the target ship is traveling, the ship control system 2 can determine the location of the ship, calculate the required travel time length of the ship based on the location of the ship, the location of the port, the travel route and a current travel speed of the ship, and obtain the estimated arrival time based on the current time.

In an embodiment, while the target ship is traveling, it may encounter various different travel conditions, e.g., the weather or maritime conditions may vary or the ship may need to wait or yield to other ships, such that the ship may not be able to travel according to the travel route and speed predetermined at the time of departure. In this case, the ship control system 2 can determine the location of the target ship, re-plan the route based on the location of the target ship, determine the travel speed, calculate the required travel time length of the ship, and obtain the estimated arrival time based on the current time.

In an embodiment, when the target ship approaches the area where the target shore crane apparatus is located, the ship control system 2 can control the target ship to move to the operation area of the target shore crane apparatus in accordance with the received ship berthing task containing the identification information and operation area of the target shore crane apparatus. When the target ship is in position, the ship control system 2 can transmit the ship in-position notification message to the shore crane control system 3 of the target shore crane apparatus and wait for the ship loading operation.

In an embodiment, after entering a wireless signal coverage of the port, the ship control system 2 of the target ship can establish communication with the target shore crane apparatus wirelessly based on the identification information of the target shore crane apparatus, determine the location of the target shore crane apparatus based on the identification information of the target shore crane apparatus, plan a route for moving to the operation area of the target shore crane apparatus, adjust the planed travel route by communicating with the shore crane apparatus, arrive at the operation area and wait for container loading.

In an embodiment of the present disclosure, the target ship can plan the travel route from the location of the target ship to the port or from the current location to the operation area by using any existing navigation algorithm or by using any third-party navigation software (the present disclosure is not limited thereto).

In some optional embodiments, the shore crane control system 3 controlling the target shore crane apparatus to load the container on the transportation vehicle onto the target ship in accordance with the received ship loading task may include the shore crane control system 3 confirming, upon receiving a vehicle in-position notification message from the vehicle control system 4 of the transportation vehicle, identification information of the container on the transportation vehicle, controlling the target shore crane apparatus to load the container on the transportation vehicle onto the target ship when the identification information is confirmed, and marking the container in the ship loading task as in a loaded state; and the shore crane control system 3 transmitting a ship loading completion notification message to the scheduling center system 1 and/or the ship control system 2 of the target ship when determining that all containers in the ship loading task have been marked as in the loaded state.

In particular, the containers on the target ship can be arranged in columns, with multiple containers being stacked in layers in each column. Upon receiving the vehicle in-position notification message from the vehicle control system 4, the shore crane control system 3 can compare the container information in the ship loading task with the identification information of the container carried by the transportation vehicle, and when they match each other, determine that the identification information of the container carried by the transportation vehicle is confirmed, control the target shore crane apparatus to load the container on the transportation vehicle onto the target ship, and mark the container in the ship loading task as in the loaded state.

In some optional embodiments, a tag containing the identification information of the container can be provided at the surface of the container. For example, the tag can be a Quick Response (QR) code or a barcode, and the shore crane control system 3 can confirm the identity of the container on the transportation vehicle by recognizing the QR code or barcode on the container.

In an embodiment, the shore crane control system 3 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoisting arm of the target shore crane apparatus and can obtain the identification information of the container by scanning the QR code or barcode on the container, compare the identification information of the container with the identification information of the container in the ship loading task, and determine that the identity is confirmed when they match each other, or otherwise determine that the confirmation of the identity fails.

In an embodiment, the identification information of the container can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the ship loading task, and determining that the identity is confirmed when they match each other, or otherwise determining that the confirmation of the identity fails.

In an embodiment, when the shore crane control system 3 is controlling the shore crane apparatus to hoist the containers onto the target ship, the containers to be loaded onto the target ship can be loaded by columns and stacked layer by layer per column (the containers are loaded one column of container loading areas after another).

In an embodiment of the present disclosure, when the containers are loaded onto the target ship for transportation, they can be loaded in different categories depending on their respective destination ports, so as to reduce the workload of hoisting operations when they arrive at their destinations and improve the operation efficiency.

In an embodiment, the shore crane control system 3 can obtain its own location information by means of positioning, and exchange information with the ship control system 2 and the vehicle control system 4, so as to obtain the location information of the target ship and the location information of the transportation vehicle, and hoist the container onto the target ship based on its own location information, the location information of the target ship and the location information of the transportation vehicle.

In an embodiment, the hoisting arm of the shore crane apparatus can be provided with an end effector, and the container can be provided with a grab section coordinated with the end effector. The shore crane apparatus lifts the container by grabbing the grab section of the container with the end effector.

In an embodiment, in a container lifting operation, the shore crane control system 3 can capture an image of the grab section of the container, determine orientation information of the grab section based on the image, and adjust a movement gesture of the end effector based on the orientation information of the grab section, such that the end effector can grab the grab section precisely to lift the container.

In an embodiment of the present disclosure, the hoisting arm can be a hoister. A lock can be provided at each of four corners of a lower part of the hoister (i.e., the four locks constitute the end effector). A lock hole coordinated with the lock is provided at each of four corners of the top of the container (i.e., the four lock holes constitute the grab section). When the four locks of the hoister are inserted into the four lock holes on the containers, the hoister can lift the container. Of course, in some other examples, the hoisting arm can be a hoister having a hook provided at its lower part (i.e., the hook constitutes the end effector). A buckle or ring can be provided on the top of the container. When the hook of the hoister is hooked to the buckle or ring on the top of the container, the hoister can lift the container.

In some optional embodiments, the warehouse management system 5 assigning the warehouse hoisting apparatus to hoist the target container in the container distribution task onto the transportation vehicle may include: the warehouse management system 5 transmitting a container loading hoisting task containing a storage location of the container to a hoisting control system of the warehouse hoisting apparatus based on a target container area for each container in the container distribution task; and the warehouse management system 5 marking the container in the container distribution task as in a distributed state upon receiving a container loading completion notification message from the hoisting control system of the warehouse hoisting apparatus, and transmitting a container distribution task completion notification message to the scheduling center system 1 when determining that all containers in the container distribution task have been marked as in the distributed state.

Upon receiving the container loading hoisting task, the hoisting control system of the warehouse hoisting apparatus can control the warehouse hoisting apparatus to lift the container at the storage location in the container loading hoisting task, load the container onto the transportation vehicle upon receiving a transportation vehicle in-position notification message, and transmit a container loading completion notification message to the warehouse management system 5 or the vehicle control system 4 of the transportation vehicle.

In some optional embodiments, the warehouse management system 5 can be further configured to: confirm the identity of the container at the container storage location in the container distribution task, and assign the warehouse hoisting apparatus to hoist the container onto the transportation vehicle when the identity is confirmed.

In some optional embodiments, a tag containing the identification information of the container can be provided at the surface of the container. For example, the tag can be a Quick Response (QR) code or a barcode, and the warehouse management system can confirm the identity of the container at the storage location by recognizing the QR code or barcode on the container.

In an embodiment, the warehouse management system 5 can include an identity recognition device, which can be a camera, a code reader or any other device capable of recognizing a QR code or barcode (the present disclosure is not limited thereto). As an implementation of the embodiment of the present disclosure, the identity recognition device can be provided on a hoister of the warehouse hoisting apparatus and can obtain the identification information of the container by scanning the QR code or barcode on the container, compare the identification information of the container with the identification information of the container in the container distribution task, and determine that the identity is confirmed when they match each other, or otherwise determine that the confirmation of the identity fails.

In an embodiment, the tag can be an electronic tag bound to the identification information of the container. Accordingly, the identity recognition device can be an inductive reader for obtaining the identification information of the container by reading the identification information of the container from the electronic tag, comparing the identification information of the container with the identification information of the container in the container distribution task, and determining that the identity is confirmed when they match each other, or otherwise determining that the confirmation of the identity fails.

In some optional embodiments, the vehicle control system 4 can be further configured to transmit a container loading in-position notification message to the warehouse management system 5 corresponding to the container loading location when controlling the transportation vehicle to move to the container loading location in the container transportation task. The warehouse management system 5 can transmit a transportation vehicle in-position notification message to the hoisting control system of the warehouse hoisting apparatus.

In some optional embodiments, the vehicle control system 4 can be further configured to transmit a container loading in-position notification message to the warehouse management system 5 corresponding to the container loading location when controlling the transportation vehicle to move to the container loading location in the container transportation task. The warehouse management system 5 can transmit the identification information of the warehouse hoisting apparatus to the vehicle control system 4. The vehicle control system 4 can transmit a transportation vehicle in-position notification message to the hoisting control system of the warehouse hoisting apparatus.

In some optional embodiments, the vehicle control system 4 can be further configured to transmit a transportation vehicle in-position notification message to the hoisting control system of the warehouse hoisting apparatus when controlling the transportation vehicle to move to the container loading location in the container transportation task.

In some optional embodiments, the vehicle control system 4 can be further configured to transmit a container unloading in-position notification message to the shore crane control system 3 of the shore crane apparatus corresponding to the container unloading location when controlling the transportation vehicle to move to the container unloading location associated with the container transportation task.

In some optional embodiments, the vehicle control system 4 can be further configured to transmit a container loading in-position notification message to the warehouse management system 5 corresponding to the container loading location when controlling the transportation vehicle to move to the container loading location, and transmit a container unloading in-position notification message to the shore crane control system 3 of the target shore crane apparatus corresponding to the container unloading location when controlling the transportation vehicle to move to the container unloading location.

In an embodiment of the present disclosure, the vehicle control system 4 can be configured to determine a current location of the transportation vehicle, plan a first travel route from the current location of the transportation vehicle to the container loading location and control the transportation vehicle to move to the container loading location for loading the container, or plan a second travel route from the container loading location to the container unloading location and control the transportation vehicle to move to the container unloading location for unloading the container, based on the container transportation task for the transportation vehicle. While the transportation vehicle is moving, environment information can be obtained and a perception result can be determined. Travel decision information can be determined based on the perception result and the travel route. The transportation vehicle can be controlled to move to the container loading location or container unloading location along the travel route based on the travel decision information.

In an embodiment of the present disclosure, the perception result may include information on e.g., a type, shape, contour, location and distance of an obstacle around the mobile hoisting apparatus. The vehicle control system 4 can obtain the above perception result by recognizing the environment information using any existing visual processing techniques such as object detection, object tracking and semantic segmentation (the present disclosure is not limited thereto). The vehicle control system 4 can plan the travel route from the current location of the transportation vehicle to the container loading location or container unloading location using its own navigation algorithm or any third-party navigation software (the present disclosure is not limited thereto). The travel decision information may include steering information (including information on steering angle), acceleration information (including information on an opening degree of a throttle pedal), deceleration information (including information on an opening degree of a brake pedal), gear information (including information on driving, reverse or neutral gear), and the like. The specific decision algorithm can be similar to the existing decision algorithm used in the self-driving vehicles and details thereof will be omitted here.

In an embodiment of the present disclosure, the storage area of the warehouse center can be divided into a number of container areas depending on the types of container goods they can store. The containers in each container area are stacked in layers per column. The container distribution task transmitted from the scheduling center system 1 to the warehouse management system 5 of the warehouse center may contain the identification information of the container and the storage location of the container.

In an embodiment, the hoisting control system of the warehouse hoisting apparatus can determine its own location information by means of positioning, exchange information with the warehouse management system 5 and the vehicle control system 4 to obtain the storage location information of the container and the location information of the transportation vehicle, and hoist the container on the transportation vehicle to the storage location of the container, or lift and load the container at the container storage location onto the transportation vehicle, based on its own location information, the storage location information of the container and the location information of the transportation vehicle.

In an embodiment, the warehouse hoisting apparatus can be a rubber-tired gantry crane, a rail-mounted gantry crane or a forklift. The warehouse hoisting apparatus is provided with a hoisting arm, which can be a mechanical arm or a hoister (the present disclosure is not limited thereto). In an embodiment, the hoisting arm of the warehouse hoisting apparatus may have a specific structure similar to the hoisting arm of the shore crane apparatus. For the lifting operation process for the warehouse hoisting apparatus to lift the container, reference can be made to the lifting operation process for the shore crane apparatus and details thereof will be omitted here.

In some optional embodiments, the container transportation task in the above embodiment can be generated by the shore crane control system 3 based on the ship loading task and transmitted to the vehicle control system 4 of the transportation vehicle.

In some optional embodiments, the container transportation task in the above embodiment can be generated by the warehouse management system 5 based on the container distribution task and transmitted to the vehicle control system 4 of the transportation vehicle.

In some optional embodiments, the ship loading plan may contain the ship loading start time, the ship loading end time, the identification information of the target shore crane apparatus, the container unloading location corresponding to the target shore crane apparatus, the identification information of the target ship, the identification information of the warehouse management system, the identification information of the transportation vehicle, and the identification information and the storage location for each container.

The scheduling center system 1 generating the container transportation task and the container distribution task based on the ship loading plan may include: the scheduling center system 1 generating the container transportation task containing the container loading location and the container unloading location, and generating the container distribution task containing the ship loading start time, the ship loading end time, the identification information of the target shore crane apparatus, the identification information of the target ship, the identification information of the warehouse management system, and the identification information and the storage location for each container.

In an embodiment, the remote communication between the scheduling center system 1 and the ship control system 2 of the target ship can be performed by means of satellite communication. For the implementation of the satellite communication between the ship control system 2 and the scheduling center system 1, reference can be made to the existing satellite communication technology and details thereof will be omitted here. Within the wireless signal coverage of the port, the scheduling center system 1, the shore crane control system 3 of the target shore crane apparatus, the warehouse management systems 5 of the warehouse center and the vehicle control system 4 of the transportation vehicle can communicate with each other by means of wireless communication. The wireless communication can be Narrow Band Internet of Things (NB-IoT), 4G, WIFI, Zigbee or the like, and the present disclosure is not limited thereto.

Figure 2:
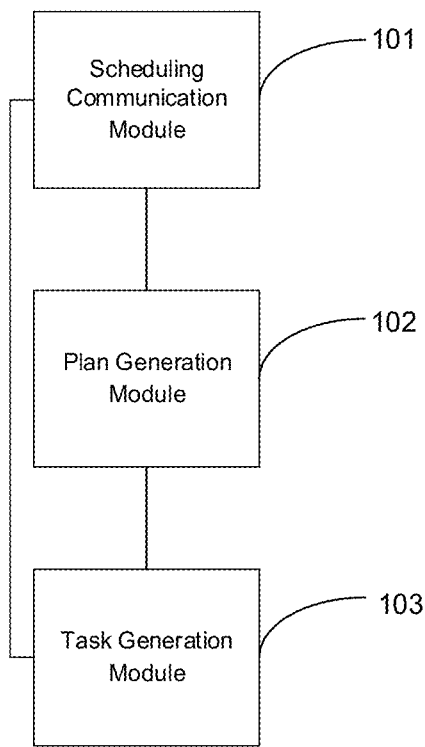
FIG. 2 is a schematic diagram showing a structure of a scheduling center system according to an embodiment of the present disclosure.

Based on the same application concept, according to an embodiment of the present disclosure, a scheduling center system 1 is provided. Referring to FIG. 2, the scheduling center system 1 includes at least one machine executable instruction. The at least one machine executable instruction includes a scheduling communication module 101, a plan generation module 102 and a task generation module 103. The at least one machine executable instruction is executed by a processor such that: the scheduling communication module 101 is configured to transmit and receive information, the plan generation module 102 is configured to determine a ship loading plan based on ship information, container information, and shore crane apparatus information, and the task generation module 103 is configured to generate a ship berthing task, a ship loading task, and a container distribution task based on the ship loading plan, and transmit the ship berthing task, the ship loading task, and the container distribution task to a ship control system of a target ship, a shore crane control system of a target shore crane apparatus, and a warehouse management system of a warehouse center, respectively, via the scheduling communication module 101 (i.e., the scheduling center system 1 transmits the ship berthing task to the ship control system of the target ship, transmits the ship loading task to the shore crane control system of the target shore crane apparatus, and transmits the container distribution task to the warehouse management system).

In some optional embodiments, the scheduling communication module 101 can transmit and receive information using any of various communication protocols. The transmitted or received information can be transmitted or received via an antenna or transceiver coupled to the communication module 101.

In some optional embodiments, the task generation module 103 can be further configured to generate a container transportation task based on the ship loading plan and transmit the container transportation task to a vehicle control system of a transportation vehicle via the scheduling communication module 101.

Based on the same application concept, according to an embodiment of the present disclosure, a scheduling center system 1 is provided. The scheduling center system 1 includes at least one processor and at least one memory. The at least one memory stores at least one machine executable instruction executable by the at least one processor. The at least one machine executable instruction includes the modules shown in FIG. 2. The at least one machine executable instruction can also provide modules for functions such as an operating system and a human-machine interaction interface. The at least one processor executes the at least one machine executable instruction to implement the above described operations, processes and functions of the scheduling center system 1 as shown in FIG. 1. The scheduling center system 1 according to the embodiment of the present disclosure can be provided at a specified location in a port, e.g., at a central control center or a centralized control center. The control center can further include other control systems or scheduling systems and can communicate with other external management systems, e.g., a customs management system. The scheduling center system 1 according to the embodiment of the present disclosure can also communicate with the other systems in the control center and/or the external management systems.

Figure 3:
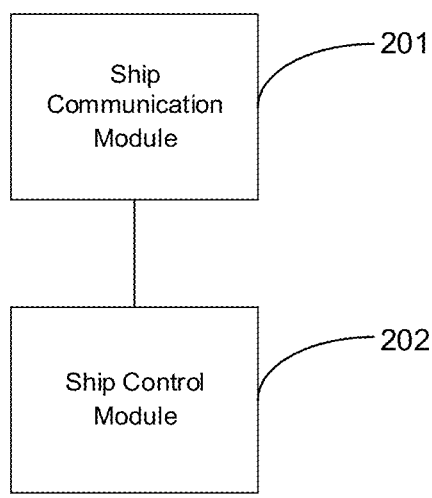
FIG. 3 is a schematic diagram showing a structure of a ship control system according to an embodiment of the present disclosure.

Based on the same application concept, according to an embodiment of the present disclosure, a ship control system 2 is provided. Referring to FIG. 3, the ship control system 2 includes at least one machine executable instruction. The at least one machine executable instruction includes a ship communication module 201 and a ship control module 202. The at least one machine executable instruction is executed by a processor such that: the ship communication module 201 is configured to transmit and receive information, and the ship control module 202 is configured to receive a ship berthing task from a scheduling center system via the ship communication module 201, control a target ship to move to an operation area corresponding to a target shore crane apparatus in accordance with the received ship berthing task, and transmit a ship in-position notification message to a shore crane control system of the target shore crane apparatus via the ship communication module 201.

In some optional embodiments, the ship communication module 201 can transmit and receive information using any of various communication protocols. The transmitted or received information can be transmitted or received via an antenna or transceiver coupled to the communication module 201.

Based on the same application concept, according to an embodiment of the present disclosure, a ship control system 2 is provided. The ship control system 2 includes at least one processor and at least one memory. The at least one memory stores at least one machine executable instruction executable by the at least one processor. The at least one machine executable instruction includes the modules shown in FIG. 3. The at least one machine executable instruction can also provide modules for functions such as an operating system and a human-machine interaction interface. The at least one processor executes the at least one machine executable instruction to implement the above described operations, processes and functions of the ship control system 2 as shown in FIG. 1.

Based on the same application concept, according to an embodiment of the present disclosure, a ship is provided. The ship includes the ship control system 2 according to the above embodiment. The ship control system 2 can communicate with other control devices or control apparatuses in the ship, such that these systems, control devices or apparatuses cooperate to achieve navigation and control of the ship, thereby allowing the ship to travel efficiently.

Figure 4:
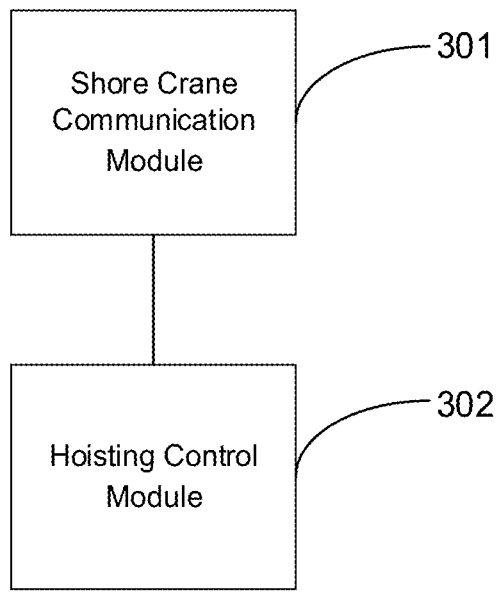
FIG. 4 is a first schematic diagram showing a structure of a shore crane control system according to an embodiment of the present disclosure.

Based on the same application concept, according to an embodiment of the present disclosure, a shore crane control system 3 is provided. Referring to FIG. 4, the shore crane control system 3 includes at least one machine executable instruction. The at least one machine executable instruction includes a shore crane communication module 301 and a hoisting control module 302. The at least one machine executable instruction is executed by a processor such that: the shore crane communication module 301 is configured to transmit and receive information, and the hoisting control module 302 is configured to receive a ship loading task transmitted from a scheduling center system via the shore crane communication module 301, and upon receiving a ship in-position notification message transmitted from a ship control system via the shore crane communication module 301, control a target shore crane apparatus to load a container on a transportation vehicle onto a target ship in accordance with the received ship loading task.

In some optional embodiments, the shore crane communication module 301 can transmit and receive information using any of various communication protocols. The transmitted or received information can be transmitted or received via an antenna or transceiver coupled to the communication module 301.

Figure 5:
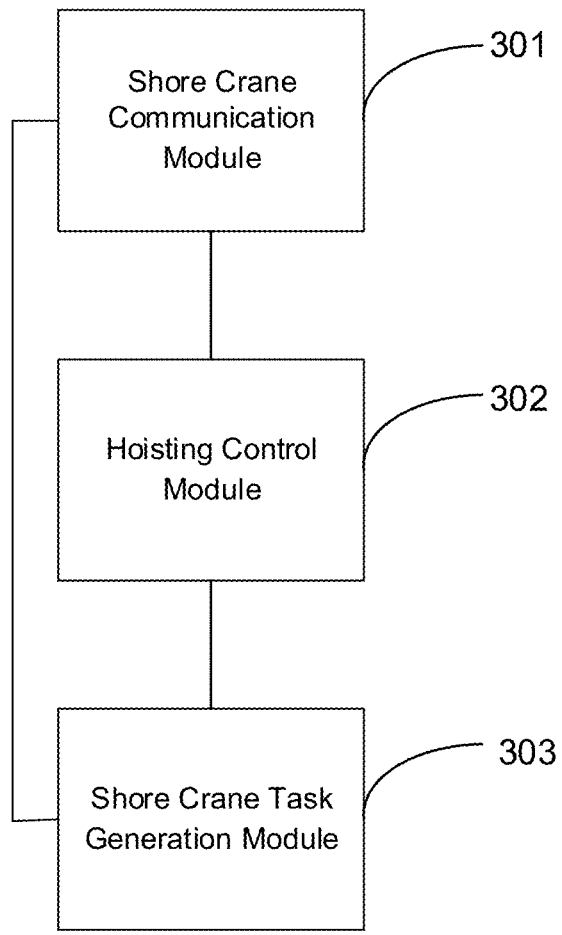
FIG. 5 is a second schematic diagram showing a structure of a shore crane control system according to an embodiment of the present disclosure.

In some optional embodiments, referring to FIG. 5, the shore crane control system 3 can further include a shore crane task generation module 303 configured to generate a container transportation task based on the ship loading task and transmit the container transportation task to a vehicle control system of the transportation vehicle via the shore crane communication module 301.

In some optional embodiments, the hoisting control module 302 controlling the target shore crane apparatus to load the container on the transportation vehicle onto the target ship in accordance with the received ship loading task may include: confirming, upon receiving a vehicle in-position notification message from the vehicle control system of the transportation vehicle via the shore crane communication module 301, identification information of the container on the transportation vehicle, controlling the target shore crane apparatus to load the container on the transportation vehicle onto the target ship when the identification information is confirmed, and marking the container in the ship loading task as in a loaded state; and transmitting a ship loading completion notification message to the scheduling center system and/or the ship control system of the target ship via the shore crane communication module 301 when determining that all containers in the ship loading task have been marked as in the loaded state.

Based on the same application concept, according to an embodiment of the present disclosure, a shore crane control system 3 is provided. The shore crane control system 3 includes at least one processor and at least one memory. The at least one memory stores at least one machine executable instruction executable by the at least one processor. The at least one machine executable instruction includes the modules shown in FIG. 4 or 5. The at least one machine executable instruction can also provide modules for functions such as an operating system and a human-machine interaction interface. The at least one processor executes the at least one machine executable instruction to implement the above described operations, processes and functions of the shore crane control system 3 as shown in FIG. 1.

Based on the same application concept, according to an embodiment of the present disclosure, a shore crane apparatus is provided. The shore crane apparatus includes the shore crane control system 3 according to the above embodiment. The shore crane control system 3 can be provided in a control room of the shore crane apparatus. The control room may further include other systems, apparatuses and devices for controlling the shore crane apparatus. Alternatively, the shore crane control system 3 can be provided at any other specified location on the shore crane apparatus. The shore crane control system 3 can communicate with the other systems, apparatuses and devices in the control room, such that these systems, apparatuses and devices cooperate to control the operations of the shore crane apparatus.

Figure 6:
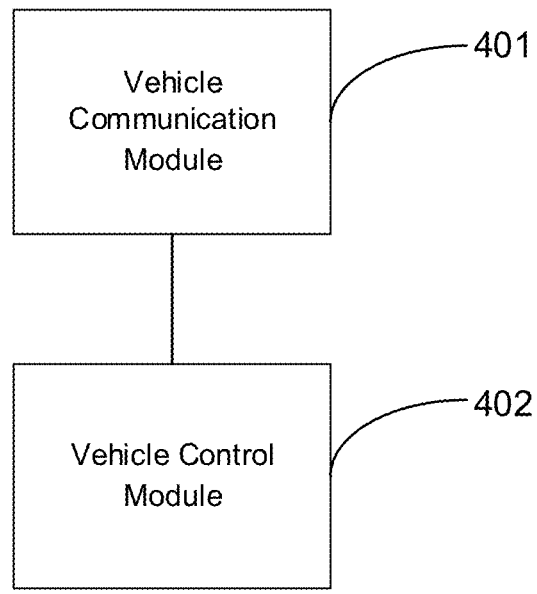
FIG. 6 is a schematic diagram showing a structure of a vehicle control system according to an embodiment of the present disclosure.

Based on the same application concept, according to an embodiment of the present disclosure, a vehicle control system 4 is provided. Referring to FIG. 6, the vehicle control system 4 includes at least one machine executable instruction. The at least one machine executable instruction includes a vehicle communication module 401 and a vehicle control module 402. The at least one machine executable instruction is executed by a processor such that: the vehicle communication module 401 is configured to transmit and receive information, and the vehicle control module 402 is configured to control, upon receiving a container transportation task via the vehicle communication module 401, a transportation vehicle to move to a container loading location associated with the container transportation task for loading a container, and to control, when completing the loading of the container, the transportation vehicle to move to a container unloading location associated with the container transportation task for unloading the container.

In some optional embodiments, the vehicle communication module 401 can transmit and receive information using any of various communication protocols. The transmitted or received information can be transmitted or received via an antenna or transceiver coupled to the communication module 401.

Based on the same application concept, according to an embodiment of the present disclosure, a vehicle control system 4 is provided. The vehicle control system 4 includes at least one processor and at least one memory. The at least one memory stores at least one machine executable instruction executable by the at least one processor. The at least one machine executable instruction includes the modules shown in FIG. 6. The at least one machine executable instruction can also provide modules for functions such as an operating system and a human-machine interaction interface. The at least one processor executes the at least one machine executable instruction to implement the above described operations, processes and functions of the vehicle control system 4 as shown in FIG. 1.

Based on the same application concept, according to an embodiment of the present disclosure, a transportation vehicle is provided. The transportation vehicle includes the vehicle control system 4 according to the above embodiment.

Figure 7:
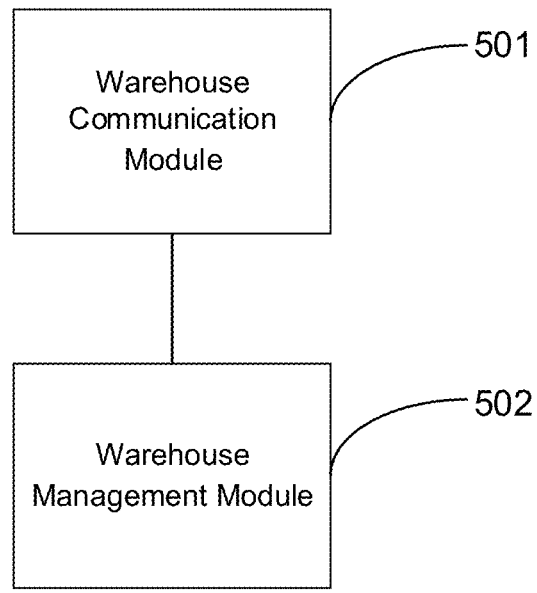
FIG. 7 is a schematic diagram showing a structure of a warehouse management system according to an embodiment of the present disclosure.

Based on the same application concept, according to an embodiment of the present disclosure, a warehouse management system is provided. Referring to FIG. 7, the warehouse management system includes at least one machine executable instruction. The at least one machine executable instruction includes a warehouse communication module 501 and a warehouse management module 502. The at least one machine executable instruction is executed by a processor such that: the warehouse communication module 501 is configured to transmit and receive information, and the warehouse management module 502 is configured to assign, upon receiving a container distribution task via the warehouse communication module 501, a warehouse hoisting apparatus to hoist a target container in the container distribution task onto a transportation vehicle.

In some optional embodiments, the vehicle communication module 501 can transmit and receive information using any of various communication protocols. The transmitted or received information can be transmitted or received via an antenna or transceiver coupled to the communication module 501.

In some optional embodiments, the warehouse management module 502 assigning the warehouse hoisting apparatus to hoist the target container in the container distribution task onto the transportation vehicle may include the warehouse management module 502 transmitting a container loading hoisting task containing a storage location of the container to a hoisting control system of the warehouse hoisting apparatus based on a target container area for each container in the container distribution task; and the warehouse management module 502 marking the container in the container distribution task as in a distributed state upon receiving a container loading completion notification message from the hoisting control system of the warehouse hoisting apparatus, and transmitting a container distribution task completion notification message to a scheduling center system via the warehouse communication module 501 when determining that all containers in the container distribution task have been marked as in the distributed state.

Based on the same application concept, according to an embodiment of the present disclosure, a warehouse management system 5 is provided. The warehouse management system 5 includes at least one processor and at least one memory. The at least one memory stores at least one machine executable instruction executable by the at least one processor. The at least one machine executable instruction includes the modules shown in FIG. 7. The at least one machine executable instruction can also provide modules for functions such as an operating system and a human-machine interaction interface. The at least one processor executes the at least one machine executable instruction to implement the above described operations, processes and functions of the warehouse management system 5 as shown in FIG. 1.

Unless stated otherwise specifically, terms such as processing, calculating, operating, determining, displaying and the like may refer to an action and/or procedure performed by one or more processing or computing systems or similar devices. The action and/or procedure can be represented as a data operation on a physical (e.g., electronic) quantity in a register or memory of a processing system or a conversion into other data similarly represented as a physical quantity in a memory or register of a processing system or any other similar information storage, transmission or display device. Information or signals can be represented using any of various different techniques and methods. For example, the data, instructions, commands, information, signals, bits, symbols and chips mentioned throughout the above description can be represented using voltages, currents, electromagnetic waves, magnetic fields or particles, optical fields or particles, or any combination thereof.

It should be noted that any particular order or hierarchy of the steps in the disclosed process is only an example of an exemplary method. It can be appreciated that, depending on design preferences, the particular order or hierarchy of the steps in the disclosed process can be re-arranged without departing from the scope of the present disclosure. The method claims as attached show elements of the respective steps in an exemplary order, but they are not limited to the particular order or hierarchy as described.

In the above detailed description, various features may be combined together in one single embodiment for simplicity. However, such disclosure should not be interpreted as reflecting an intent that the implementation of the claimed subject matter requires more features than those clearly defined in each claim. Rather, as reflected by the claims as attached, the present disclosure may be in a state having less than all features of the one single embodiment as disclosed. Therefore, the claims are hereby explicitly incorporated into the detailed description and each claim individually constitutes a separate preferred embodiment of the present disclosure.

It can be appreciated by those skilled in the art that various illustrative logic blocks, modules, circuits and algorithm steps described in connection with the embodiments of the present disclosure can be implemented as electronic hardware, computer software or any combination thereof. In order to clearly illustrate the interchangeability between the hardware and the software, the illustrative components, blocks, modules, circuits and steps have been described above generally with respect to their functions. Depending on specific applications and design constraints applied to the entire system, the functions can be implemented in either hardware or software. For each specific application, those skilled in the art can implement the described function flexibly. However, such implementation decision should not be interpreted as departing from the scope of the present disclosure.

The steps of the methods or algorithms described in connection with the embodiments of the present disclosure can be embodied directly as hardware, software modules executable by processors or any combination thereof. The software modules can be provided in a RAM, a flash memory, a ROM, an EPROM, an EEPROM, a register, a hard drive, a removable magnetic drive, a CD-ROM or any other form of storage medium known in the art. An exemplary storage medium is connected to a processor, such that the processor can read information from the storage medium or write information into the storage medium. Of course, the storage medium can alternatively be a component of the processor. The processor and the storage medium can be provided in an ASIC. The ASIC can be in a user terminal. Of course, the processor and the storage medium can be provided as separate components in a user terminal.

For software implementations, the technique described in the present disclosure can be implemented using modules (e.g., processes, functions or the like) performing the functions described in the present disclosure. These software codes can be stored in a memory unit and executed by a processor. The memory unit can be provided within the processor or externally to the processor. In the latter case, it can be communicatively coupled to the processor in various ways known in the art.

The above description includes examples of one or more embodiments. Of course, it would be impossible to describe all possible combinations of components or methods in order to describe the above embodiments. However, it can be appreciated by those skilled in the art that the embodiments can be further combined and arranged. Thus, the embodiments described herein are intended to cover all such changes, modifications and variants that fall within the scope of the claims as attached. Further, the term "including" as used in the description or claims has a coverage similar to that of the term "comprising" when used in the claims as a transition word. Moreover, any term "or" as used in the claims or description is to be interpreted as "or in a non-exclusive sense".

What is claimed is:

1. A shore crane control system, comprising at least one machine executable instruction, the at least one machine executable instruction comprising a shore crane communication module, a shore crane task generation module, and a hoisting control module, wherein the at least one machine executable instruction is executed by a processor such that:
   the shore crane communication module is configured to transmit and receive information,
   the hoisting control module is configured to receive a ship loading task transmitted from a scheduling center system via the shore crane communication module, and upon receiving a ship in-position notification message transmitted from a ship control system via the shore crane communication module, control a target shore crane apparatus to load a container on a transportation vehicle onto a target ship in accordance with the received ship loading task,
   and
   the shore crane task generation module is configured to generate a container transportation task based on the ship loading task and transmit the container transportation task to a vehicle control system of the transportation vehicle via the shore crane communication module.

2. The shore crane control system of claim 1, further comprising:
   an end effector, configured to grab a grab section of the container so as to lift the container.

3. The shore crane control system of claim 2, further comprising:
   an image capturing device, configured to capture an image of the grab section of the container,
   wherein the hoisting control module is further configured to:
      determine orientation information of the grab section based on the image; and
      adjust a movement gesture of the end effector based on the orientation information of the grab section, such that the end effector grabs the grab section.

4. The shore crane control system of claim 2, wherein:
   the grab section of the container comprises lock holes at corners of a top of the container,
   the end effector comprises locks provided at corners of a lower part of a hoisting arm of the target shore crane apparatus, and
   the hoisting arm is configured to lift the container in response to the locks being inserted into the lock holes.

5. The shore crane control system of claim 1, further comprising:
   an inductive reader on a hoisting arm of the target shore crane apparatus, wherein the inductive reader is configured to:
   obtain identification information of the container by reading an electronic tag on the container; and
   compare the identification information of the container with a corresponding identification information in the ship loading task.

6. The shore crane control system of claim 1, wherein the hoisting control module being configured to control the target shore crane apparatus to load the container on the transportation vehicle onto the target ship in accordance with the received ship loading task comprises the hoisting control module being configured to:
   confirm, upon receiving a vehicle in-position notification message from the vehicle control system of the transportation vehicle via the shore crane communication module, identification information of the container on the transportation vehicle;
   control the target shore crane apparatus to load the container on the transportation vehicle onto the target ship when the identification information is confirmed;
   mark the container in the ship loading task as in a loaded state; and
   transmit a ship loading completion notification message to the scheduling center system and/or the ship control system of the target ship via the shore crane communication module when determining that all containers in the ship loading task have been marked as in the loaded state.

7. The shore crane control system of claim 1, further comprising:
an identity recognition device on a hoisting arm of the target shore crane apparatus, wherein the identity recognition device is configured to:
obtain identification information of the container by scanning a QR code or barcode on the container; and
compare the identification information of the container with a corresponding identification information in the ship loading task.

8. A shore crane control system, comprising at least one machine executable instruction, the at least one machine executable instruction comprising a shore crane communication module and a hoisting control module, wherein the at least one machine executable instruction is executed by a processor such that:
the shore crane communication module is configured to transmit and receive information, and
the hoisting control module is configured to:
receive a ship loading task transmitted from a scheduling center system via the shore crane communication module;
upon receiving a ship in-position notification message transmitted from a ship control system via the shore crane communication module, control a target shore crane apparatus to load a container on a transportation vehicle onto a target ship in accordance with the received ship loading task;
confirm, upon receiving a vehicle in-position notification message from the vehicle control system of the transportation vehicle via the shore crane communication module, identification information of the container on the transportation vehicle;
control the target shore crane apparatus to load the container on the transportation vehicle onto the target ship when the identification information is confirmed;
mark the container in the ship loading task as in a loaded state; and
transmit a ship loading completion notification message to the scheduling center system and/or the ship control system of the target ship via the shore crane communication module when determining that all containers in the ship loading task have been marked as in the loaded state.

9. The shore crane control system of claim 8, further comprising:
an identity recognition device on a hoisting arm of the target shore crane apparatus, wherein the identity recognition device is configured to:
obtain identification information of the container by scanning a QR code or barcode on the container; and
compare the identification information of the container with a corresponding identification information in the ship loading task.

10. The shore crane control system of claim 8, further comprising:
an inductive reader on a hoisting arm of the target shore crane apparatus, wherein the inductive reader is configured to:
obtain identification information of the container by reading an electronic tag on the container; and
compare the identification information of the container with a corresponding identification information in the ship loading task.

11. The shore crane control system of claim 8, further comprising:
an end effector, configured to grab a grab section of the container so as to lift the container.

12. The shore crane control system of claim 11, further comprising:
an image capturing device, configured to capture an image of the grab section of the container,
wherein the hoisting control module is further configured to:
determine orientation information of the grab section based on the image; and
adjust a movement gesture of the end effector based on the orientation information of the grab section, such that the end effector grabs the grab section.

13. The shore crane control system of claim 11, wherein:
the grab section of the container comprises lock holes at corners of a top of the container,
the end effector comprises locks provided at corners of a lower part of a hoisting arm of the target shore crane apparatus,
the hoisting arm are configured to lift the container in response to the locks being inserted into the lock holes.

14. The shore crane control system of claim 8, further comprising a shore crane task generation module configured to generate a container transportation task based on the ship loading task and transmit the container transportation task to a vehicle control system of the transportation vehicle via the shore crane communication module.

* * * * *